United States Patent [19]

Hiiro

[11] Patent Number: 5,617,246
[45] Date of Patent: Apr. 1, 1997

[54] POLARIZED LIGHT COHERENT COMBINING LASER APPARATUS

[75] Inventor: Hiroyuki Hiiro, Kanagawa-ken, Japan

[73] Assignee: Fuji Photo Film Co., Ltd., Kanagawa-ken, Japan

[21] Appl. No.: 374,851

[22] Filed: Jan. 19, 1995

[30] Foreign Application Priority Data

Feb. 17, 1994 [JP] Japan .................................. 6-020383

[51] Int. Cl.$^6$ .................................................. G02B 5/30
[52] U.S. Cl. ......................... 359/494; 359/497; 359/498; 359/499; 372/105; 372/106
[58] Field of Search .................................. 359/494, 495, 359/497, 498, 499; 372/105, 106

[56] References Cited

U.S. PATENT DOCUMENTS

| | | | |
|---|---|---|---|
| 4,914,664 | 4/1990 | Woodward | 372/105 |
| 5,062,694 | 11/1991 | Bair | 372/105 |
| 5,091,912 | 2/1992 | Bretenaker et al. | 372/105 |
| 5,107,509 | 4/1992 | Esterowitz et al. | 372/105 |
| 5,164,946 | 11/1992 | Negus et al. | 372/105 |

OTHER PUBLICATIONS

Optics Letters, vol. 11, No. 5, May 1986 "Fabrication and Evaluation of Laminated Polarization Splitters Consisting of a–Si:H / SiO2 Multilayers" Tsuchida et al OQE 91–143, pp. 67–72.

*Primary Examiner*—Ricky D. Shafer

[57] ABSTRACT

A polarized light coherent combining laser apparatus comprises a unit, which is constituted of a compensating phase difference plate, a polarized light separating element, and a phase difference plate. A phase difference and an angle of inclination of principal axes of the phase difference plate are set so as to satisfy specific conditions in accordance with the intensity ratio between two linearly polarized laser beams, which impinge upon the unit. The two linearly polarized laser beams, which have the directions of polarization orthogonal to each other and which impinge upon the unit, are combined with each other by the polarized light separating element. The combined laser beam is converted by the phase difference plate into a beam polarized linearly in a predetermined direction. The resulting beam passes through an analyzer, is reflected by a radiating mirror, and again impinges upon the unit. The laser beams having separated from each other in the unit are then reflected by mirror surfaces of laser beam sources. The laser beams are thus repeatedly reflected between the mirror surfaces of the laser beam sources and the radiating mirror and are thereby combined coherently.

19 Claims, 6 Drawing Sheets

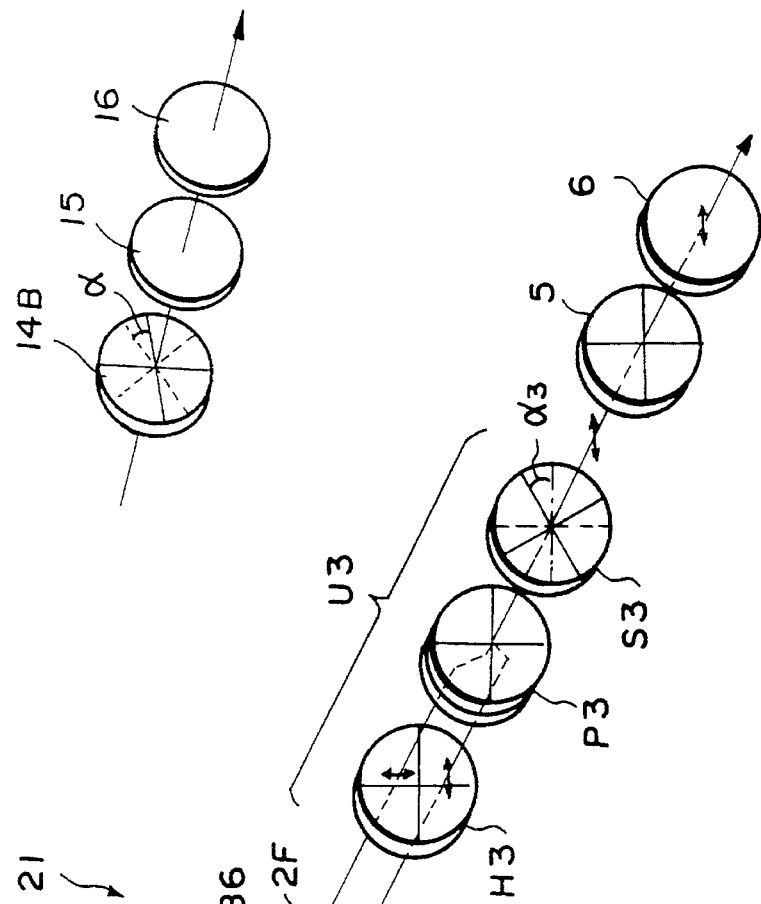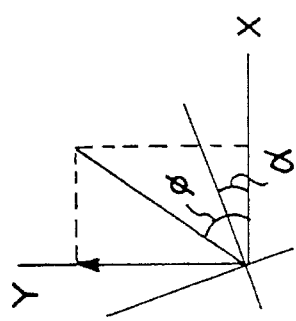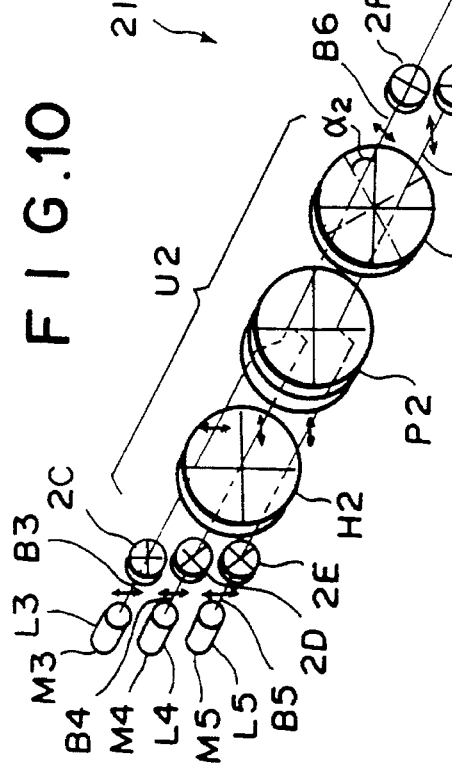

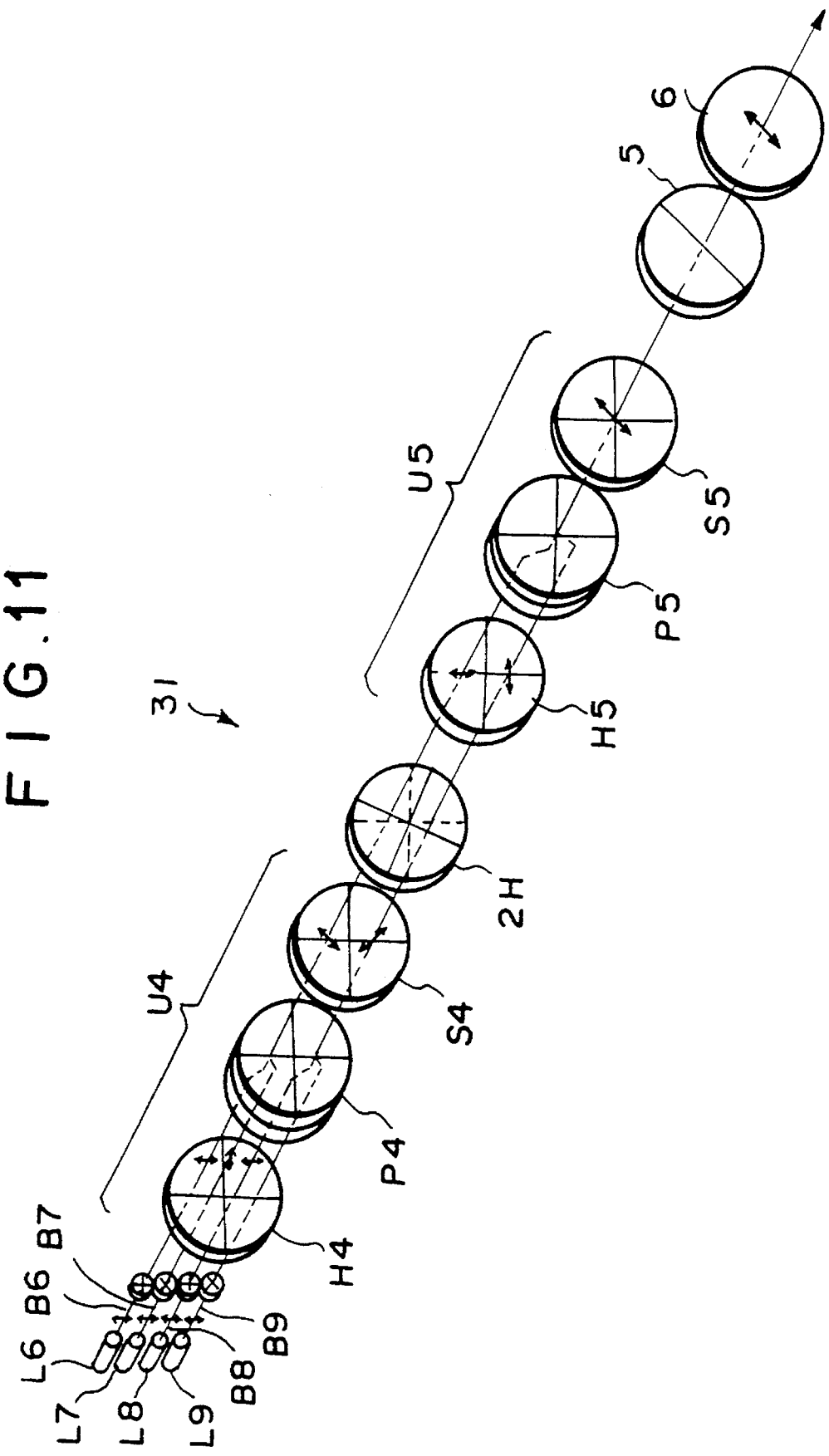

POLARIZED LIGHT COHERENT COMBINING LASER APPARATUS

BACKGROUND OF THE INVENTION

1. Field of the Invention

This invention relates to a polarized light coherent combining laser apparatus. This invention particularly relates to a polarized light coherent combining laser apparatus, which is capable of combining a plurality of laser beams with one another and thereby obtaining a combined laser beam having a high energy.

2. Description of the Prior Art

As an apparatus for recording information, such as characters, on a recording material by utilizing a light beam, a laser computer output microfilmer (hereinafter referred to as a laser COM) has heretofore been proposed. With the laser COM, a laser beam is scanned in accordance with the information fed out of a computer, and the information, such as characters, is thereby directly recorded on a recording material, such as a microfilm. (The laser COM is described in, for example, U.S. Pat. No. 4,293,202.) The laser COM comprises an argon laser for producing a laser beam, an optical modulator for optically modulating the laser beam in accordance with the information, which represents characters, or the like, a rotating polygon mirror for deflecting the laser bream, which has been modulated by the optical modulator, in a main scanning direction, and a galvanometer mirror provided with a deflecting mirror for deflecting the laser beam, which has been reflected by the rotating polygon mirror, in a sub-scanning direction. With the combination of the rotating polygon mirror and the galvanometer mirror, the laser beam, which has been radiated out of the optical modulator, is two-dimensionally scanned on the recording material via a scanning lens. In this manner, the information, such as characters, is recorded on the recording material.

The laser COM described above utilizes the argon laser, which cannot be subjected to on/off control, and therefore it is necessary to provide the optical modulator. Accordingly, it has recently been proposed to utilize a semiconductor laser in lieu of the argon laser. However, in cases where semiconductor lasers are caused to oscillate continuously, the output power of the semiconductor lasers is as small as several milliwatts to several tens of milliwatts. Therefore, it is difficult for the semiconductor lasers to be applied to recording materials, which require a laser beam having a high energy, e.g., heat mode recording materials, such as laser direct recording films (LDFs).

Also, a technique for coherently combining the laser beams, which have been produced by a plurality of lasers, with one another by use of a diffraction grating and thereby producing a laser beam in a single polarized state has been disclosed in, for example, OPTICS LETTERS/Vol. 11, No. 5/May 1986.

However, the disclosed technique has the problems described below. Specifically, with the technique wherein the laser beams are combined with one another by using the diffraction grating, it is difficult to design the grooved surface configuration of the grating such that the direction of diffraction may coincide with a predetermined direction. Also, only the zero-order diffracted light component should be passed through an aperture, and the laser beams having been diffracted in nonessential directions should be blocked. Therefore, the efficiency of the optical system cannot be kept high.

Further, the laser beams, which have been produced by two semiconductor lasers, have heretofore been combined with each other by a polarizing beam splitter. However, the combined laser beam contains a P-polarized light component, which oscillates parallel to the plane of incidence upon the polarizing beam splitter, and an S-polarized light component, which oscillates in the direction normal to the plane of incidence upon the polarizing beam splitter. Therefore, if a polarizing element is located in the optical path of the combined laser beam, one half of the amount of light cannot pass through the polarizing element.

Accordingly, the applicant proposed a light amplifying device, which has a simple construction and can efficiently radiate out a laser beam having a high energy, in U.S. Pat. No. 5,048,030.

The proposed light amplifying device comprises:

i) an optical resonator constituted by first and second reflecting mirrors and a common reflecting mirror, which are located in optically opposite relation to each other, the common reflecting mirror having a reflectivity smaller than the reflectivities of the first and second reflecting mirrors, ii) an optical path changing means, which is located between the first and second reflecting mirrors and the common reflecting mirror for making the laser beams incoming from a side of the common reflecting mirror emerge in a direction toward at least one of the first and second reflecting mirrors corresponding to either direction of an orthogonal plane of polarization, and for making laser beams incoming from the sides of the first and second reflecting mirrors incident upon the common reflecting mirror, iii) first and second amplifying media, which are located in optical paths of the laser beams between the first and second reflecting mirrors and the optical path changing means, respectively, for amplifying the laser beams through the process of stimulated emission, and iv) an optical element, which is located between the common reflecting mirror and the optical path changing means such that the optical element may be capable of transmitting the laser beams therethrough, and which rotates the plane of polarization of the laser beam having been reflected by the common reflecting mirror by a predetermined angle with respect to the plane of polarization of the laser beam coming from the optical path changing means.

With the proposed light amplifying device, the optical path changing means is located between the first and second reflecting mirrors and the common reflecting mirror, which are located in optically opposite relation to each other and which jointly constitute the optical resonator. The optical path changing means makes a laser beam incoming from the side of the common reflecting mirror emerge in a direction toward at least one of the first and second reflecting mirrors corresponding to either direction of the orthogonal planes of polarization. Also, the optical path changing means makes the laser beams incoming from the sides of the first and second reflecting mirrors incident upon the common reflecting mirror. The first and second amplifying media are located in optical paths of the laser beams between the optical path changing means and the first and second reflecting mirrors, respectively. Therefore, the laser beams coming from the optical path changing means are amplified through the respective amplifying media and then reflected by the first and second reflecting mirrors. Thereafter, the reflected laser beams are amplified again by the amplifying media and impinge upon the common reflecting mirror via the optical path changing means. The optical element is located between the common reflecting mirror and the optical path changing means. The optical element rotates the plane of polarization of the laser beam, which has been reflected by the common reflecting mirror, by a predetermined angle with respect to the plane of polarization of the laser beam coming from the optical path changing means. The direction of the optical path of the laser beam, which has passed through the optical element and again enters the optical path changing means, is changed to the direction toward at least one of the first and second reflecting mirrors in accordance with the direction of the plane of polarization of the laser beam having been rotated by the optical element. In this manner, the laser beam is caused to impinge upon the respective amplifying media.

In cases where the polarized light beams having the planes of polarization orthogonal to each other are P-polarized light and S-polarized light, the optical element serves to convert part or the whole of the P-polarized light into the S-polarized light and serves to convert part or the whole of the S-polarized light into the P-polarized light during the repeated reflection cycles of the polarized laser beams. Therefore, the optical resonator, which is constituted of the first reflecting mirror, the common reflecting mirror, and the amplifying medium located therebetween, and the optical resonator, which is constituted of the second reflecting mirror, the common reflecting mirror, and the amplifying medium located therebetween, jointly constitute a single united resonator, and the P-polarized light and the S-polarized light are thereby coherently combined with each other. Therefore, the P-polarized light and the S-polarized light are unified into a laser beam, which has a high energy and is in a single polarized state. In cases where the laser beams to be combined together have a phase difference therebetween, elliptically polarized light will ordinarily be obtained. In such cases, a combined laser beam in a single linearly polarized state can be obtained by compensating for the phase difference with a wavelength plate, or the like.

Recently, in the fields of optical fiber communication and optoelectronics, various attempts have been made to utilize a two-dimensional array of laser beam sources. The two-dimensional array comprises a plurality of laser beam sources, which are located in a two-dimensional pattern, such that a plurality of laser beams may be radiated out of the two-dimensional array to the direction normal to the two-dimensional array and may thereby be transmitted.

However, U.S. Pat. No. 5,048,030 does not indicate anything about a configuration for combining the laser beams radiated out of a two-dimensional array of laser beam sources. Thus with the light amplifying device disclosed in U.S. Pat. No. 5,048,030, a plurality of laser beams radiated out of a two-dimensional array of laser beam sources cannot be coherently combined with one another to yield a laser beam having a high energy.

In particular, if the laser beams produced by the respective laser beam sources constituting a two-dimensional array can be combined with one another, a laser beam having a high energy can be obtained with a compact configuration.

SUMMARY OF THE INVENTION

The primary object of the present invention is to provide a polarized light coherent combining laser apparatus, which is capable of combining a plurality of laser beams having been produced by a plurality of laser beam sources arrayed in a two-dimensional pattern and thereby obtaining a combined laser beam having a high energy.

Another object of the present invention is to provide a polarized light coherent combining laser apparatus, which has a simple construction and yields a combined laser beam having a high energy.

The present invention provides a polarized light coherent combining laser apparatus, comprising:
 i) at least a single unit comprising:
  a) a polarized light separating element for combining two linearly polarized laser beams, which have a predetermined intensity ratio with respect to each other and have the directions of polarization orthogonal to each other, with each other into a single combined laser beam and radiating out the combined laser beam, the polarized light separating element also separating a single laser beam, which impinges upon the polarized light separating element from a direction reverse to the direction along which the single combined laser beam was radiated out of the polarized light separating element, into two linearly polarized laser beams, which are parallel to each other and have the directions of polarization orthogonal to each other, and radiating out the two linearly polarized laser beams, which have thus been separated from each other, respectively in directions reverse to the directions, along which the two laser beams to be combined with each other by the polarized light separating element impinged upon the polarized light separating element,
  b) a compensating phase difference plate, which is located in the optical paths of the two linearly polarized laser beams having the directions of polarization orthogonal to each other and impinging upon the polarized light separating element, and which compensates for phases of the two linearly polarized laser beams, and
  c) a phase difference plate, which is located in the optical path of the single combined laser beam having been radiated out of the polarized light separating element, and which has a phase difference in accordance with the intensity ratio of the two linearly polarized laser beams having the directions of polarization orthogonal to each other and having impinged upon the polarized light separating element and has principal axes inclined by a predetermined angle with respect to the directions of polarization,
 ii) a plurality of laser beam sources, which are located on an approximately identical plane and radiate a plurality of laser beams traveling in parallel and having predetermined planes of polarization, the laser beam sources radiating the plurality of the laser beams such that two adjacent laser beams may constitute the laser beams polarized linearly in two directions of polarization of the polarized light separating element, which directions are orthogonal to each other, with respect to the polarized light separating element,
 iii) reflecting mirrors, each of the reflecting mirrors reflecting the laser beam, which impinges upon the corresponding laser beam source from a direction reverse to the direction along which the laser beam was radiated out of the corresponding laser beam source, toward the direction along which the laser beam was radiated out of the corresponding laser beam source,
 iv) the number of the unit being set in accordance with the number of the plurality of the laser beam sources,
 v) the respective units being located such that a laser beam having been radiated out of each unit may impinge upon the compensating phase difference plate of a unit, which is located at the next stage, vi) a polarization plane rotating phase difference plate, which is located between adjacent units, the polarization plane rotating phase difference plate rotating the plane of polarization of each laser beam such that adjacent laser beams, which are among the laser beams having been radiated out of each unit, may constitute the-laser beams polarized linearly in two directions of polarization of the polarized light separating element of a unit located at the next stage, which directions are orthogonal to each other, and vii) a radiating reflecting mirror, which is located in the optical path of the laser beam having been radiated out of a unit at a last stage among the respective units, the radiating reflecting mirror reflecting the laser beam, which has been radiated out of the unit at the last stage, in a predetermined proportion, the phase difference and the angle of inclination of the principal axes of the phase difference plate of each unit being set such that, in cases where $0<|\alpha_i|<\pi/2$ and $\delta_i \neq m_i \cdot \pi/2$, wherein $\alpha_i$ represents the angle of inclination of the principal axes of the phase difference plate of an i'th unit, as counted from the unit at the first stage among the units, $\delta_i$ represents the phase difference of the phase difference plate of the i'th unit, and $m_i$ is an integer, the angle of inclination $\alpha_i$ of the principal axes and the phase difference $\delta_i$ satisfy the conditions $$\phi_i = \tan^{-1}\sqrt{C_i}$$

$$\cos 2\delta_i = \tan\alpha_i / \tan 2\phi_i$$

wherein $C_i$ represents the intensity ratio of the two linearly polarized laser beams having the directions of polarization orthogonal to each other and impinging upon the i'th unit.

In the polarized light coherent combining laser apparatus in accordance with the present invention, the laser beam sources radiate the plurality of the laser beams such that the two adjacent laser beams may constitute the laser beams polarized linearly in two directions of polarization of the polarized light separating element, which directions are orthogonal to each other, with respect to the polarized light separating element. For this purpose, the laser beam sources may be constituted such that two adjacent laser beam sources themselves can produce the laser beams polarized linearly in two directions of polarization, which directions are orthogonal to each other, with respect to the polarized light separating element. Alternatively, the laser beam sources may be constituted such that two adjacent laser beam sources may produce the laser beams having arbitrary planes of polarization, and the laser beam sources may be provided with polarization plane compensating phase difference plates, which compensate for the planes of polarization such that the two adjacent laser beams may constitute the laser beams polarized linearly in two directions of polarization, which directions are orthogonal to each other, with respect to the polarized light separating element.

The polarized light coherent combining laser apparatus in accordance with the present invention may be modified such that an analyzer may be located in the optical path of the laser beam, which has been radiated out of the unit at the last stage, between the unit at the last stage and the radiating reflecting mirror, the analyzer transmitting a predetermined polarized light component of the laser beam.

With the polarized light coherent combining laser apparatus in accordance with the present invention, each of the plurality of units is constituted of the compensating phase difference plate, the polarized light separating element, and the phase difference plate, which has the predetermined phase difference and the predetermined angle of inclination of the principal axes. The plurality of the units are located such that the laser beam having been radiated out of each unit may impinge upon the compensating phase difference plate of a unit, which is located at the next stage. The radiating reflecting mirror is located in the optical path of the laser beam, which has been radiated out of the unit at the last stage. Also, the polarized light coherent combining laser apparatus in accordance with the present invention is provided with the plurality of the laser beam sources, which are located on an approximately identical plane and radiate a plurality of laser beams traveling in parallel and having predetermined planes of polarization. The laser beam sources radiate the plurality of the laser beams such that two adjacent laser beams may constitute the two linearly polarized laser beams, which have the directions of polarization orthogonal to each other. The laser beams, which have been radiated out of the laser beam sources, impinge upon the unit at the first stage. Further, the reflecting mirrors are located in the optical paths of the laser beams. Each of the reflecting mirrors reflects the laser beam, which impinges upon the corresponding laser beam source from a direction reverse to the direction along which the laser beam was radiated out of the corresponding laser beam source, toward the direction along which the laser beam was radiated out of the corresponding laser beam source.

The compensating phase difference plate compensates for the phases of the plurality of the laser beams, which have been radiated out of the laser beam sources. Thereafter, the laser beams impinge upon the polarized light separating element. The polarized light separating element combines the two linearly polarized laser beams, which are adjacent to each other among the plurality of the laser beams impinging upon the polarized light separating element, and which have a predetermined intensity ratio with respect to each other and have the directions of polarization orthogonal to each other, with each other into the single combined laser beam. The polarized light separating element radiates out the single combined laser beam. Also, the polarized light separating element separates a single laser beam, which impinges upon the polarized light separating element from a direction reverse to the direction along which the single combined laser beam was radiated out of the polarized light separating element, into two linearly polarized laser beams, which are parallel to each other and have the directions of polarization orthogonal to each other. The polarized light separating element radiates out the two linearly polarized laser beams, which have thus been separated from each other, respectively in directions reverse to the directions, along which the two linearly polarized laser beams to be combined with each other by the polarized light separating element impinged upon the polarized light separating element.

The single combined laser beam, which has been radiated out of the polarized light separating element, impinges upon the phase difference plate. By the effects of the phase difference plate, the polarized light components of the single combined laser beam in the directions of the principal axes of the phase difference plate are imparted with a predetermined phase lag therebetween, and the single combined laser beam is converted into linearly polarized light. Further, the polarization plane rotating phase difference plate is located between this unit and the adjacent unit at the next stage. The polarization plane rotating phase difference plate rotates the plane of polarization of each laser beam such that the adjacent laser beams, which are among the laser beams having been radiated out of each unit, may constitute the laser beams polarized linearly in two directions of polarization of the polarized light separating element of a unit located at the next stage, which directions are orthogonal to each other. The linearly polarized laser beams, which have thus been obtained, impinge upon the compensating phase difference plate of the unit at the next stage.

In the unit at the next stage, as in the unit at the preceding stage, the phases of the incident laser beams are compensated for by the compensating phase difference plate. The laser beams are then combined with each other by the polarized light separating element. The combined laser beam impinges upon the phase difference plate. By the effects of the phase difference plate, the polarized light components in the directions of the principal axes of the phase difference plate are imparted with a predetermined phase lag therebetween, and the combined laser beam is converted into linearly polarized light. The resulting laser beam is then radiated out of the unit.

The processes described above are carried out in each unit. The laser beam, which has been radiated out of the unit at the last stage, is reflected by the radiating reflecting mirror and impinges reversely upon the unit at the last stage. After the laser beam has thus impinged reversely upon the unit at the last stage, by the effects of the phase difference plate of the unit at the last stage, the polarized light components of the laser beam in the directions of the principal axes of the phase difference plate are imparted with a predetermined phase lag therebetween, and the laser beam is converted into elliptically polarized light. The resulting laser beam is then split by the polarized light separating element into two linearly polarized laser beams, which are parallel to each other and have the directions of polarization orthogonal to each other. The phases of the two linearly polarized laser beams, which have thus been separated from each other, are then compensated for by the compensating phase difference plate. Thereafter, the linearly polarized laser beams are radiated out of the unit at the last stage and impinge upon the preceding unit. In the same manner as that described above, the polarized light components of the laser beam, which has thus impinged upon the preceding unit, in the directions of the principal axes of the phase difference plate are imparted with a predetermined phase lag therebetween, and the laser beam is converted into elliptically polarized light. The resulting laser beam is then split by the polarized light separating element into two linearly polarized laser beams.

As will be described later, the phase difference plate has a phase difference in accordance with the intensity ratio of the two incident linearly polarized light components having the directions of polarization orthogonal to each other and has a predetermined angle of inclination of the principal axes. In such cases, part or the whole of each of the two linearly polarized light components, which have the directions of polarization orthogonal to each other, is converted into the other linearly polarized light component having the orthogonal direction of polarization. The converted linearly polarized light components impinge reversely upon the polarized light separating element and split into two linearly polarized laser beams, which have the directions of polarization orthogonal to each other. Such operations are carried out during the repeated reflection cycles between the radiating reflecting mirror and each reflecting mirror for reflecting the laser beam, which impinges upon the corresponding laser beam source from a direction reverse to the direction along which the laser beam was radiated out of the corresponding laser beam source, toward the direction along which the laser beam was radiated out of the corresponding laser beam source. Therefore, the radiating reflecting mirror and the reflecting mirror of each laser beam source jointly constitute a resonator, and the two linearly polarized laser beams, which have the directions of polarization orthogonal to each other, are thereby coherently combined with each other. Accordingly, in cases where the phase difference and the rotation angle of the principal axes of the phase difference plate are set at predetermined values, and the operation of the polarized light separating element for combining the two parallel laser beams into a single combined laser beam is repeated, the plurality of the parallel laser beams impinging upon the respective units are unified into a laser beam, which has a high energy and is in a single polarized state. In this manner, a laser beam having a high energy and a single polarized state can be obtained with a simple configuration and with a high efficiency.

BRIEF DESCRIPTION OF THE DRAWINGS

FIG. 8 is a graph showing an angle of the s axis of a $\lambda\delta/\pi$ plate with respect to the direction of ordinary-ray polarization of a polarizing element, FIG. 9 is a perspective view showing a configuration of the phase difference plate of the polarized light coherent combining laser apparatus in cases where $0<|\alpha|<\pi/2$ and $\delta\neq m\cdot\pi/2$, FIG. 10 is a perspective view showing a second embodiment of the polarized light coherent combining laser apparatus in accordance with the present invention, and FIG. 11 is a perspective view showing a third embodiment of the polarized light coherent combining laser apparatus in accordance with the present invention.

DESCRIPTION OF THE PREFERRED EMBODIMENTS

The present invention will hereinbelow be described in further detail with reference to the accompanying drawings.

Figure 1:
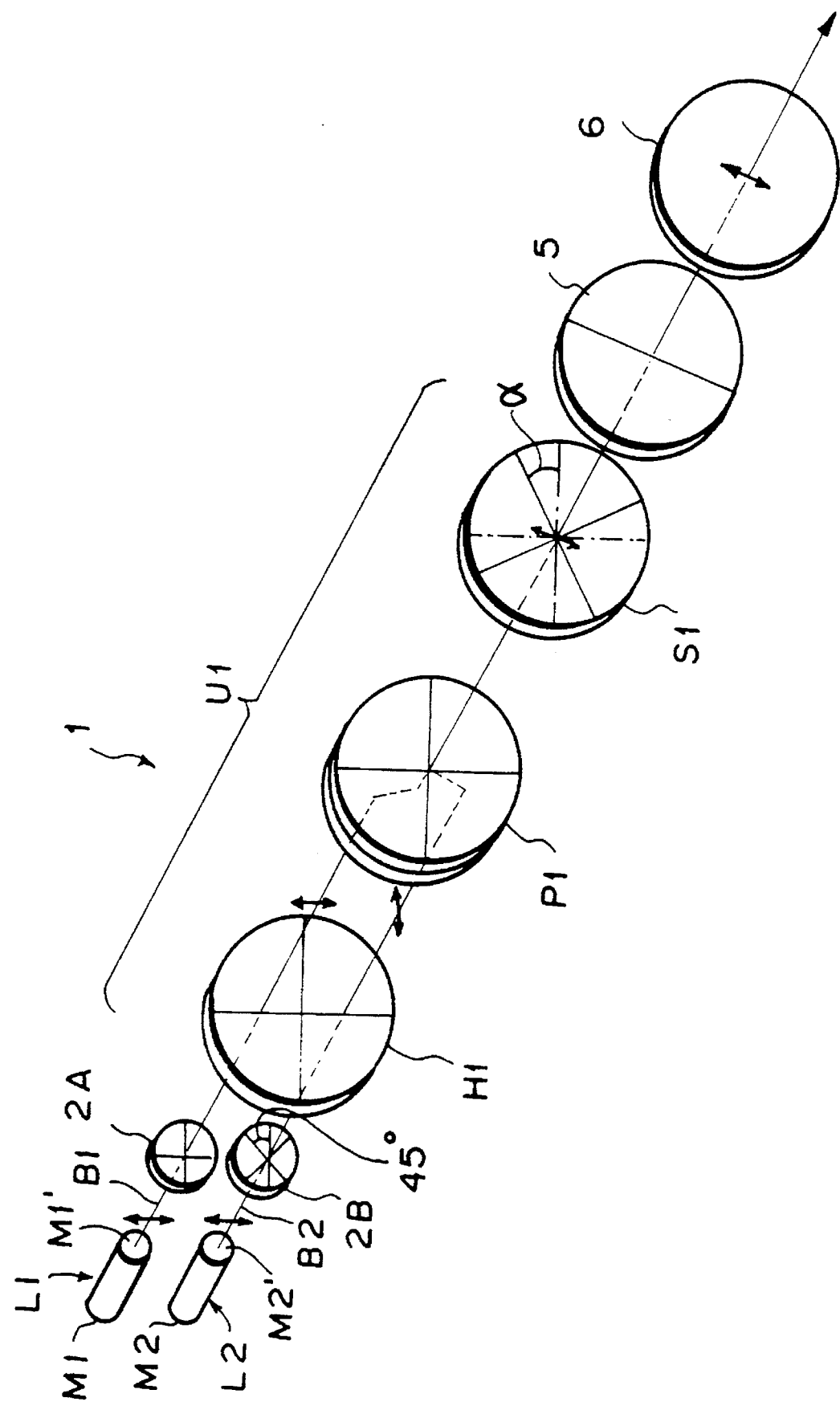
FIG. 1 is a perspective view showing a first embodiment of the polarized light coherent combining laser apparatus in accordance with the present invention.

FIG. 1 is a perspective view showing a first embodiment of the polarized light coherent combining laser apparatus in accordance with the present invention. In this embodiment, two laser beam sources are used, and a Savart plate is employed as the polarized light separating element.

The first embodiment of the polarized light coherent combining laser apparatus in accordance with the present invention comprises a single unit. How the unit is constructed will be described hereinbelow.

Figure 2:
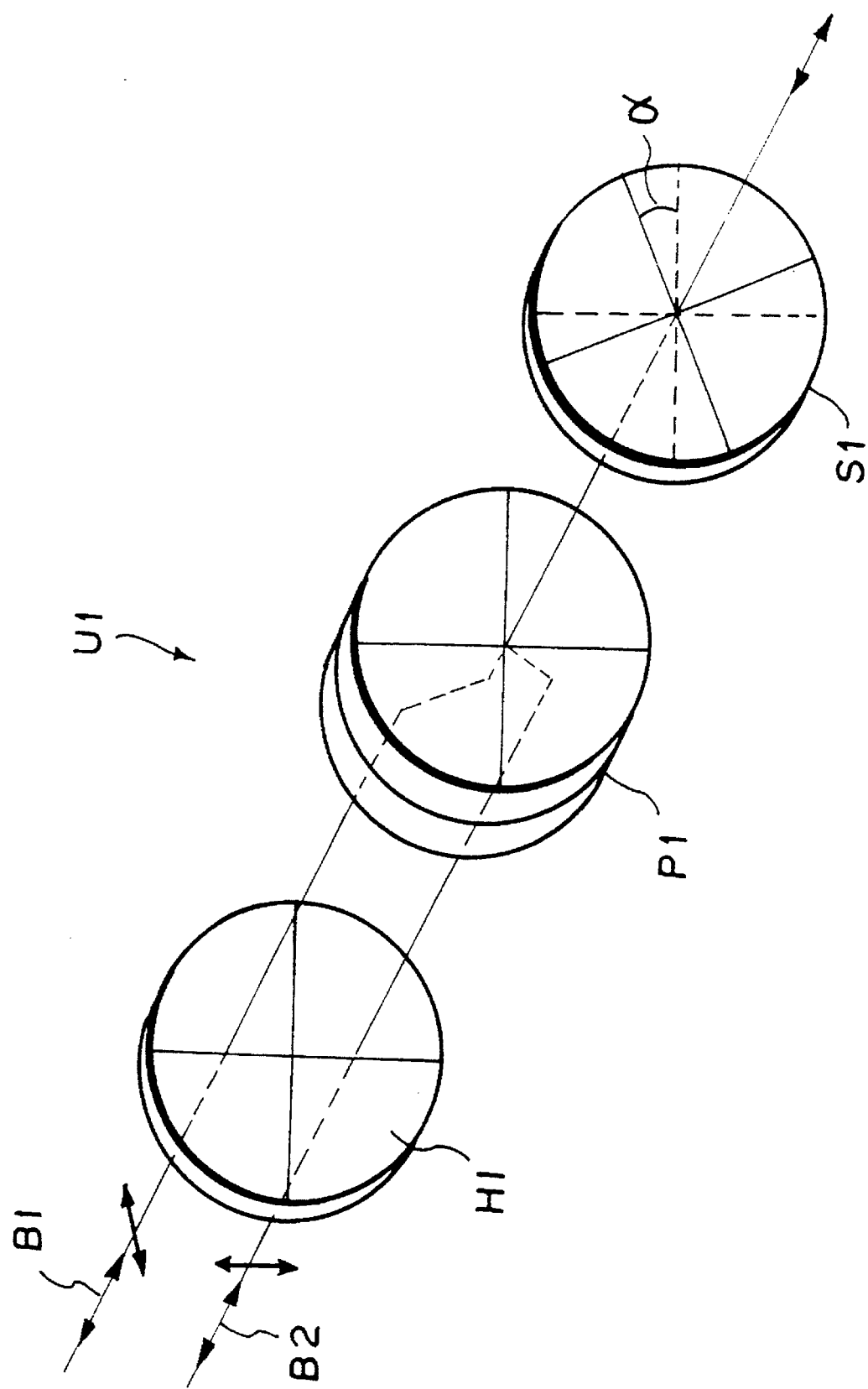
FIG. 2 is a perspective view showing a unit, which constitutes the first embodiment of the polarized light coherent combining laser apparatus in accordance with the present invention.

FIG. 2 is a perspective view showing a unit, which constitutes the first embodiment of the polarized light coherent combining laser apparatus in accordance with the present invention. As illustrated in FIG. 2, a unit U1 comprises a compensating phase difference plate H1, a Savart plate P1 serving as the polarized light separating element, and a phase difference plate S1.

Figure 3:
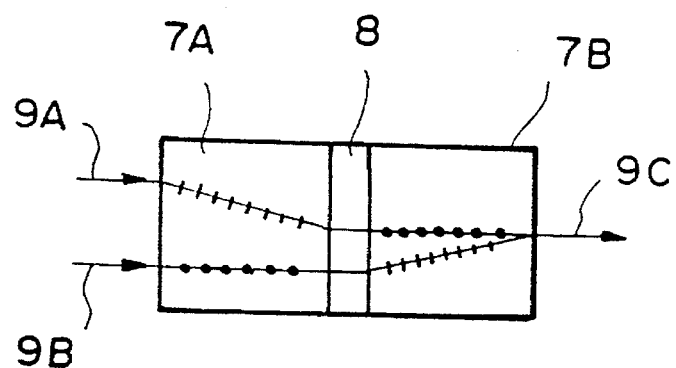
FIG. 3 is an explanatory view showing a Savart plate.

As illustrated in FIG. 3, the Savart plate P1 comprises calcite 7A, calcite 7B, and a halfwave plate 8 sandwiched therebetween. When an extraordinary-ray laser beam 9A and an ordinary-ray laser beam 9B impinge upon the calcite 7A, the laser beam 9A is refracted by the calcite 7A, and the laser beam 9B travels straight ahead through the calcite 7A without being refracted. Thereafter, the planes of polarization of the laser beam 9A and the laser beam 9B are rotated 90° by the halfwave plate 8, and the two laser beams impinge upon the calcite 7B. The ordinary-ray laser beam 9A travels straight ahead through the calcite 7B without being refracted. The extraordinary-ray laser beam 9B is refracted by the calcite 7B. The two laser beams 9A and 9B are then radiated as a single laser beam 9C, which has the planes of polarization orthogonal to each other, out of the calcite 7B.

The phase difference plate S1 has a phase difference δ in accordance with the intensity ratio of laser beams B1 and B2 impinging upon the phase difference plate S1. The phase difference plate S1 also has the principal axes, which are inclined by a predetermined angle α with respect to the laser beam B1 and the laser beam B2. How the phase difference δ and the predetermined angle α are set will be described hereinbelow.

Figure 4:
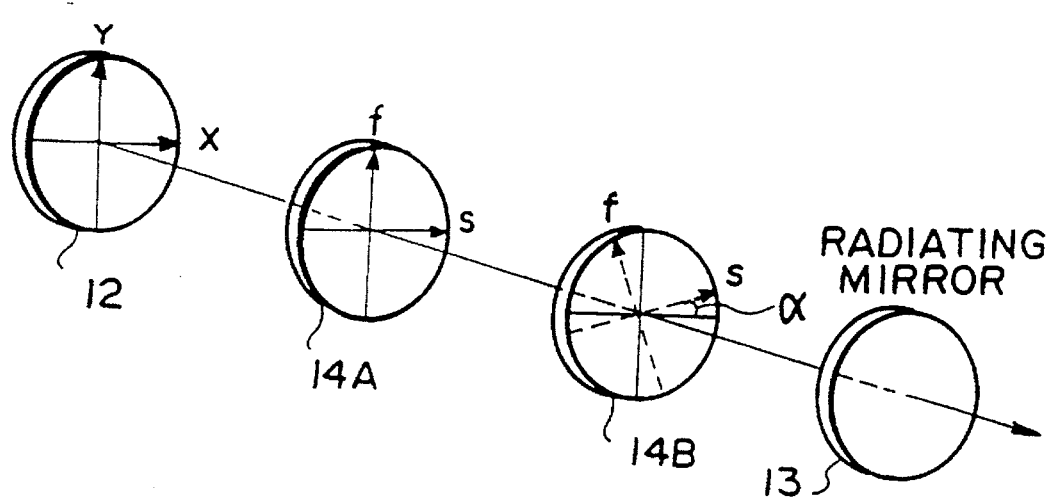
FIG. 4 is a perspective view showing a configuration of a resonator, which generalizes a twist mode.

First, it is considered to combine two laser beams, which have different intensities, with each other. Also, a configuration of a resonator, which is shown in FIG. 4 and generalizes a twist mode, is considered. Calculations are then carried out to find conditions, under which an proper mode can exist so as to obtain a linearly polarized light on the end face of a mirror 12 having a predetermined azimuthal angle with respect to the principal axes of the phase difference plate in contact with the end face of a mirror 12. In FIG. 4, each of two phase difference plates 14A and 14B is constituted of a λδ/π plate. Also, the angle of rotation between the first phase difference plate 14A and the second phase difference plate 14B is equal to α.

In general, the eigen mode of the resonator can be calculated as an eigen vector V of an eigen equation $$JV = \lambda V \quad V = \begin{pmatrix} V_x \\ V_y \end{pmatrix} \quad (1)$$

In this case, the (x,y) coordinate system is considered as being fixed such that the x axis may coincide with the s axis of the principal axes of the first λδ/π plate 14A. In Formula (1), J is a 2×2 Jones matrix representing one round trip of the resonator, and V is an electric field vector. The Jones matrix J can be calculated with Formula (2).

$$J = M \times P \times R(\alpha) \times P \times M \times P \times R(\alpha) \times P \quad (2)$$

$$= \begin{pmatrix} J_{11} & J_{12} \\ J_{21} & J_{22} \end{pmatrix} = \begin{pmatrix} J_{11} & J_{12} \\ J_{12} & J_{11*} \end{pmatrix}$$

$$= \begin{pmatrix} e^{-i4\delta}\cos^2(\alpha) + \sin^2(\alpha) & -i \cdot \sin(2\delta)\sin(2\alpha) \\ -i \cdot \sin(2\delta)\sin(2\alpha) & e^{i4\delta}\cos^2(\alpha) + \sin^2(\alpha) \end{pmatrix}$$

In Formula (2), as will be shown below, P represents the Jones matrix of the phase difference plate, R(α) represents the coordinate rotation matrix, and M represents the sign inversion matrix at the time of reflection.

$$P = \begin{pmatrix} e^{-i\delta} & 0 \\ 0 & e^{i\delta} \end{pmatrix} R(\alpha) = \begin{pmatrix} \cos(\alpha) & \sin(\alpha) \\ -\sin(\alpha) & \cos(\alpha) \end{pmatrix} M = \begin{pmatrix} -1 & 0 \\ 0 & 1 \end{pmatrix}$$

An eigen value λ in the eigen equation of Formula (1) can be calculated from the Jones matrix J by solving an eigen equation $$\begin{vmatrix} J_{11}-\lambda & J_{12} \\ J_{21} & J_{22}-\lambda \end{vmatrix} = \lambda^2 - (J_{11}+J_{22})\lambda + J_{11}J_{22} - J_{12}J_{21} = 0 \quad (3)$$

From Formula (3), the eigen value A has two solutions shown below.

$$\lambda = \frac{1}{2}\{(J_{11}+J_{22}) \pm \sqrt{(J_{11}+J_{22})^2 - 4(J_{11}J_{22}-J_{12}J_{21})}\} \quad (4)$$

$$= \sin^2(\alpha) + \cos(4\delta)\cos^2(\alpha) \pm i \cdot$$

$$2\sin(2\delta)\cos(\alpha)\sqrt{1-\sin^2(2\delta)\cos^2(\alpha)}$$

In this case, $J_{11}-\lambda$ can be expressed with Formula (5).

$$J_{11}-\lambda = -i \cdot 2\sin(2\delta)\cos(\alpha)\{\cos(2\delta)\cos(\alpha) \pm \sqrt{1-\sin^2(2\delta)\cos^2(\alpha)}\} \quad (5)$$

The eigen vector can be calculated by solving the eigen equation shown below with respect to the eigen value λ.

$$(J_{11}-\lambda)V_x + J_{12}V_y = 0$$

$$J_{21}V_x + (J_{22}-\lambda)V_y = 0 \quad (6)$$

How the eigen vector is derived will be described hereinbelow. In this case, the azimuthal angle is limited to the range shown below.

$$-\pi/2 < \alpha, \phi \leq \pi/2$$

First, the cases, wherein $J_{12}=-i \cdot \sin(2\alpha)\sin(2\delta)\phi 0$, are considered. Such conditions are satisfied in the cases shown below.

(1) 0<|α|<π/2 and δ≠m·π/2 (m: an integer)

In such cases, the ratio between the orthogonal components of the eigen vector can be calculated with the formula shown below.

$$\frac{V_y}{V_x} = -\left(\frac{\cos(2\delta)\cos(\alpha) \pm \sqrt{1-\sin^2(2\delta)\cos^2(\alpha)}}{\sin(\alpha)}\right) \quad (7)$$

The ratio between the orthogonal components of the eigen vector is a real number, and therefore the eigen vector is the linearly polarized light. In order for the eigen vector to become a vector having a predetermined azimuthal angle φ with respect to the x axis, the conditions shown below should be satisfied.

$$-\left(\frac{\cos(2\delta)\cos(\alpha) \pm \sqrt{1-\sin^2(2\delta)\cos^2(\alpha)}}{\sin(\alpha)}\right) = \tan(\phi) \quad (8)$$

Solving Formula (8) gives the conditional formula $$\cos(2\delta) = \frac{\tan(\alpha)}{\tan(2\phi)} \quad (9)$$

Figure 5:
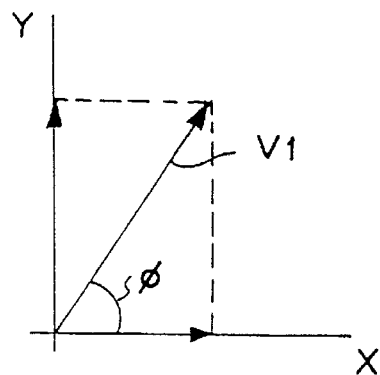
FIG. 5 is a graph showing an eigen vector.

Therefore, as illustrated in FIG. 5, if the phase difference plate satisfying Formula (9) is set, the vector having the predetermined azimuthal angle φ becomes the eigen vector. There are two independent parameters (α and Δ) of the phase difference plate satisfying Formula (9). Therefore, infinitely many ways of setting of the phase difference plate satisfying Formula (9) are possible. For example, in cases where $\phi=\pm\pi/4$, $\tan(2\phi)=\infty$, and therefore $\delta$ must take a value of Formula (10) such that Formula (9) may be satisfied. In this case, $\alpha$ can take an arbitrary value.

$$\delta=(2n+1)\cdot\pi/4 \text{ (n: an integer)} \tag{10}$$

Then, the cases, wherein $J_{12}=J_{11}-\lambda=0$ ($\alpha\neq 0$), are considered. Such conditions are satisfied in the cases shown below. In such cases, an arbitrary vector clearly becomes the eigen vector.

(2) $\delta=m\cdot\pi/2$ (m: an integer) (3) $\alpha=\pi/2$

Also, $J_{12}$ is equal to zero when $\alpha=0$. The eigen equation and the eigen value shown below obtain.

$$\begin{pmatrix} e^{-i4\delta} & 0 \\ 0 & e^{i4\delta} \end{pmatrix}\begin{pmatrix} V_x \\ V_y \end{pmatrix} = \lambda\begin{pmatrix} V_x \\ V_y \end{pmatrix} \quad \lambda = e^{-i4\delta}, e^{i4\delta}$$

Therefore, the formula $J_{11}-\lambda=0$ obtains when the conditions shown below are satisfied. At this time, an arbitrary vector becomes the eigen vector.

(4) $\alpha=0$ and $\delta=(2n+1)\cdot\pi/4$ (n: an integer)

Also, in cases where the conditions (5) $\alpha=0$ and $\delta\neq m\cdot\pi/4$ (m: an integer)

are satisfied, an arbitrary vector belonging to two eigen values $$V=\begin{pmatrix} V_x \\ 0 \end{pmatrix}, \begin{pmatrix} 0 \\ V_y \end{pmatrix}$$

becomes the eigen vector. Of the cases (1) through (5) studied above, the eigen vectors in the cases of (2), (3), (4), and (5) are not the solutions suitable for constructing the polarized light coherent combining laser apparatus, which comprises a plurality of lasers, as will be understood easily when the calculations similar to those described below are carried out. Therefore, only the solution in the cases of (1) will be studied hereinbelow.

The results of the calculations made above indicate that a vector V having a predetermined azimuthal angle becomes the eigen vector in cases where the phase difference plate satisfies the conditions shown below.

(1) $0 < |\alpha| < \frac{\pi}{2}$, $\delta \neq m \cdot \frac{\pi}{2}$ (m: an integer), and $$\cos(2\delta) = \frac{\tan(\alpha)}{\tan(2\phi)}$$

The eigen vector is expressed as $$V = \begin{pmatrix} \cos(\phi) \\ \sin(\phi) \end{pmatrix}$$

A vector, which is obtained when the eigen vector V travels through the resonator shown in FIG. 4 and arrives at the opposite mirror end face, can be expressed as the product of the Jones matrix $J_h$, which represents a half round trip of the resonator, and the eigen vector V.

$$J_h = P \times R(\alpha) \times \tag{11}$$

$$P = \begin{pmatrix} e^{-i\delta} & 0 \\ 0 & e^{i\delta} \end{pmatrix}\begin{pmatrix} \cos(\alpha) & \sin(\alpha) \\ -\sin(\alpha) & \cos(\alpha) \end{pmatrix}\begin{pmatrix} e^{-i\delta} & 0 \\ 0 & e^{i\delta} \end{pmatrix}$$

$$= \begin{pmatrix} e^{-i2\delta}\cos(\alpha) & \sin(\alpha) \\ -\sin(\alpha) & e^{i2\delta}\cos(\alpha) \end{pmatrix}$$

$$V_h = J_h \times V = \begin{pmatrix} e^{-i2\delta}\cos(\alpha) & \sin(\alpha) \\ -\sin(\alpha) & e^{i2\delta}\cos(\alpha) \end{pmatrix}\begin{pmatrix} \cos(\phi) \\ \sin(\phi) \end{pmatrix} \tag{12}$$

$$= \begin{pmatrix} e^{-i2\delta}\cos(\alpha)\cos(\phi) + \sin(\alpha)\sin(\phi) \\ -\sin(\alpha)\cos(\phi) + e^{i2\delta}\cos(\alpha)\sin(\phi) \end{pmatrix}$$

The respective components of the vector $V_h$ have values with respect to the principal axes of the second $\lambda\delta/\lambda$ plate 14B. Therefore, the ratio between the orthogonal components can be expressed with the formula $$\frac{V_{hy}}{V_{hx}} = \frac{-\sin(\alpha)\cos(\phi) + e^{i2\delta}\cos(\alpha)\sin(\phi)}{e^{-i2\delta}\cos(\alpha)\cos(\phi) + \sin(\alpha)\sin(\phi)} \tag{13}$$

The ratios between the orthogonal components in the next cases will hereinbelow be calculated with Formula (13). In cases where $0 < |\alpha| < \frac{\pi}{2}$, $\delta \neq m \cdot \frac{\pi}{2}$ (m: an integer), and $$\cos(2\delta) = \frac{\tan(\alpha)}{\tan(2\phi)}$$

A calculation with Formula (13) gives $$v_{hy}v_{hx} = \tan(-\phi) \tag{14}$$

Figure 6:
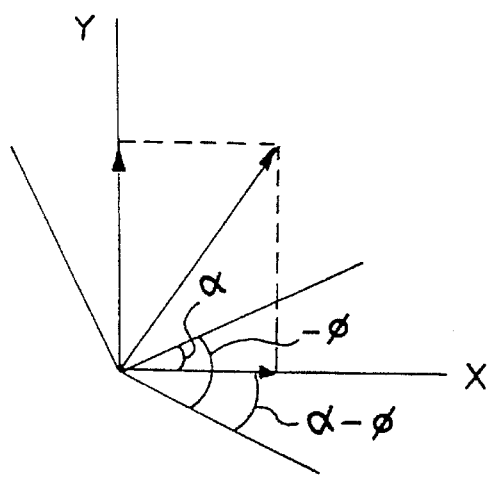
FIG. 6 is a graph showing an angle $\alpha^-\phi$ of a vector with respect to an s axis of a first $\lambda\delta/\pi$ plate.
Figure 7:
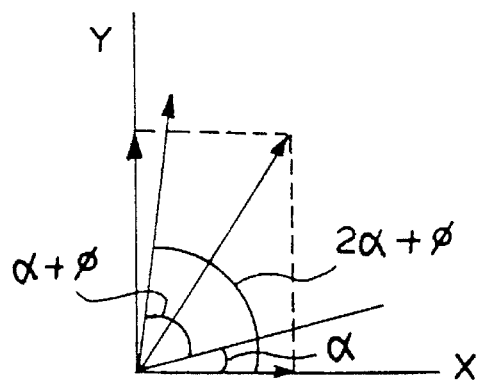
FIG. 7 is a graph showing an angle $2\alpha^+\phi$ of a vector with respect to the s axis of the first $\lambda\delta/\pi$ plate.

This formula indicates that the vector in the state, in which it has arrived at the opposite mirror end face, is the linearly polarized light and makes an angle of $-\phi$ with respect to the s axis of the adjacent second $\lambda\delta/\pi$ plate 14B. Therefore, as illustrated in FIG. 6, the angle $\theta$ with respect to the s axis of the first $\lambda\delta/\pi$ plate 14A takes the value shown below.

$$\theta = \alpha - \phi \tag{15}$$

As indicated by the aforesaid results of analysis, in general, it is possible to constitute a polarized light coherent combining laser apparatus from two lasers, which produce laser beams having different intensities. In general, the configuration of the polarized light coherent combining laser apparatus, which comprises two lasers for producing laser beams having different intensities, can be obtained by substituting the configuration of the resonator of the generalized twist mode laser, which is shown in FIG. 4, by the configuration described below.

A configuration corresponding to the eigen mode in the case described below, which is among the eigen modes described above and in which the azimuthal angle of the linearly polarized light radiated out can be controlled, will be described hereinbelow by taking the use of a plurality of lasers (where $n \geq 3$) into consideration.

In cases where $0 < |\alpha| < \pi/2$ and $\delta \neq m \cdot \pi/2$
(m: an integer)

In the configuration of the resonator of the generalized twist mode shown in FIG. 4, a polarizing element is inserted between the two $\lambda\delta/\pi$ plates 14A and 14B such that the direction of polarization of the polarizing element may coincide with the direction of the principal axis of the first $\lambda\delta/\pi$ plate 14A. In this manner, the polarizing element and the subsequent second $\lambda\delta/\pi$ plate 14B constitute a coupling device, which achieves coupling between two lasers. The azimuthal angle of the linearly polarized light, which is radiated out of each laser, is set such that the laser beams produced by the lasers can be combined with each other by the polarizing element (this also applies to the descriptions that follow). The $\lambda\delta/\pi$ plate, which constitutes the coupling device, is set so as to satisfy the conditions shown below with respect to the polarizing element and the intensity ratio C between the two linearly polarized laser beams, which have the directions of polarization orthogonal to each other and which impinge upon the polarizing element. In Formula (17), the value of $\alpha$ represents the angle between the s axis of the first $\lambda\delta/\pi$ plate and the s axis of the second $\lambda\delta/\pi$ plate. (The angle is shown in FIG. 8.)

$$\phi = \tan^{-1}\sqrt{C} \quad C = \frac{I_s}{I_p} \tag{16}$$

$$\cos(2\delta) = \frac{\tan(\alpha)}{\tan(2\phi)} \quad (\alpha: \text{arbitrary}) \tag{17}$$

In this case, the light radiated out becomes the linearly polarized light. This configuration is shown in FIG. 9.

The polarized light coherent combining laser apparatus 1 shown in FIG. 1 is composed of the unit U1, which is provided with the phase difference plate satisfying the aforesaid conditions for the phase difference $\delta_i$ and the predetermined angle $\alpha_i$ as shown in FIG. 2. How the polarized light coherent combining laser apparatus 1 shown in FIG. 1 is constructed will hereinbelow be described in more detail.

As illustrated in FIG. 1, laser beams having been produced by two semiconductor lasers L1 and L2, which are located on an approximately identical plane, impinge upon the unit U1, which comprises the compensating phase difference plate H1, the Savart plate P1, and the phase difference plate S1. An analyzer 5 and a radiating mirror 6 are located in the optical path of the laser beam, which has been radiated out of the unit U1, and the polarized light coherent combining laser apparatus 1 is thereby constructed. Specifically, all of the laser beams, which have been radiated out of the respective semiconductor lasers L1 and L2, are optically directed to the radiating mirror 6.

The surface of the radiating mirror 6, which surface stands facing the unit U1, is provided with a coating film such that the reflectivity may fall within the range of approximately 2% to approximately 5%. Mirror surfaces M1' and M2' of the semiconductor lasers L1 and L2, which mirror surfaces stand facing the unit U1, are in the anti-reflecting state. Also, surfaces M1 and M2 of the semiconductor lasers L1 and L2, which surfaces are opposite to the mirror surfaces M1' and M2', are provided with coating films such that the reflectivity may be approximately 90%. Each of the semiconductor lasers L1 and L2 is located such that an active layer sandwiched between cladding layers may be directed horizontally in FIG. 1. Further, the phase difference plate S1 has the aforesaid phase difference $\delta_1$ and the aforesaid angle of inclination $\alpha_1$ of the principal axes. In this embodiment, the laser beams radiated out of the laser beam sources L1 and L2 have an identical intensity, and therefore the phase difference $\delta_1$ becomes equal to $\pi/4$.

The planes of polarization of the laser beams B1 and B2, which have respectively been produced by the laser beam sources L1 and L2, are rotated respectively by halfwave plates 2A and 2B, which are located in the optical paths of the laser beams B1 and B2. The direction of the principal axis of the halfwave plate 2A coincides with the direction of polarization of the laser beam B1. The principal axis of the halfwave plate 2B is inclined by 45° with respect to the direction of polarization of the laser beam B2. Therefore, the planes of polarization of the laser beams B1 and B2, which have respectively been produced by the laser beam sources L1 and L2, are rotated respectively by the halfwave plates 2A and 2B, which are located in the optical paths of the laser beams B1 and B2, and the laser beams B1 and B2 are thereby converted into the laser beams having the directions of polarization, which are orthogonal to each other and coincide with the directions of the principal axes of the compensating phase difference plate H1. Also, when the laser beams B1 and B2 pass through the compensating phase difference plate H1, the phases of the laser beams B1 and B2 are compensated for, and the laser beams B1 and B2 are converted into the laser beams having a predetermined phase difference therebetween.

Thereafter, in the same manner as that explained above with reference to FIG. 3, the laser beams B1 and B2, which have passed through the compensating phase difference plate H1, are combined with each other by the Savart plate P1. The combined laser beams B1 and B2 impinge upon the phase difference plate S1. The phase difference plate S1 is constituted as a quarter-wave plate, and its principal axes are inclined by a predetermined angle $\alpha_1$. Therefore, the components of the combined laser beams B1 and B2, which have passed through the phase difference plate S1, in the directions of the principal axes of the phase difference plate S1 are imparted with a predetermined phase lag therebetween, and the laser beams B1 and B2 are thus combined and converted into linearly polarized light. The linearly polarized light, which has been radiated out of the phase difference plate S1, impinges upon the analyzer 5. The analyzer 5 is located such that it may transmit only the laser beam, which has been polarized linearly in the direction inclined 45° with respect to the principal axes of the phase difference plate S1. The laser beams B1 and B2, which have been radiated out of the phase difference plate S1, thus pass through the analyzer 5 and impinge upon the radiating mirror 6.

The laser beams B1 and B2, which have been radiated out of the analyzer 5, are reflected by the radiating mirror 6, again pass through the analyzer 5, and then impinge upon the unit U1. The laser beams, which have thus impinged upon the unit U1, are converted by the phase difference plate S1 into a circularly polarized laser beam. The circularly polarized laser beam is separated by the Savart plate P1 into an ordinary-ray laser beam and an extraordinary-ray laser beam. The separated laser beams pass through the compensating phase difference plate H1 and the halfwave plates 2A and 2B and then reversely impinge as two linearly polarized laser beams upon the semiconductor lasers L1 and L2. The two linearly polarized laser beams are then reflected by the mirror surfaces M1 and M2 and again impinge upon the unit U1.

In the same manner as that described above, the two linearly polarized laser beams, which have thus impinged upon the unit U1, are again combined with each other. The resulting combined laser beam passes through the analyzer 5 and is then reflected by the radiating mirror 6. The combined laser beam is thus again caused to impinge upon the unit U1 and subjected to the same processes as those described above.

In the manner described above, the laser beams B1 and B2, which have been produced by the semiconductor lasers L1 and L2, are repeatedly reflected between the mirror surfaces M1 and M2 of the semiconductor lasers L1 and L2 and the radiating mirror 6 and amplified by the active layers of the semiconductor lasers L1 and L2. By the effects of the analyzer 5, the phase difference plate S1, the Savart plate P1, and the compensating phase difference plate HI, the laser beams B1 and B2 having passed through the phase difference plate S1 are combined with each other and reflected repeatedly with the maximum amplification factor when the laser beams B1 and B2 have the phase difference such that the combined laser beam may become polarized linearly in the direction inclined 45° with respect to the principal axes of the phase difference plate S1. Therefore, the laser beams having been produced by the semiconductor lasers L1 and L2 are coherently combined with each other and amplified by the optical resonator, which is constituted of the reflecting surface of the radiating mirror 6 and the mirror surfaces M1 and M2 of the semiconductor lasers L1 and L2.

When the amplification factor of the combined laser beam becomes 1 or higher, the combined laser beam passes through the radiating mirror 6 and is radiated in a single polarized state out of the polarized light coherent combining laser apparatus. The laser beam having passed through the radiating mirror 6 is radiated as the linearly polarized laser beam by the effects of the analyzer 5.

A second embodiment of the polarized light coherent combining laser apparatus in accordance with the present invention will be described hereinbelow.

FIG. 10 is a perspective view showing a second embodiment of the polarized light coherent combining laser apparatus in accordance with the present invention. As illustrated in FIG. 10, the second embodiment of the polarized light coherent combining laser apparatus in accordance with the present invention comprises three laser beam sources L3, L4, and L5, which are located on an approximately identical plane. Laser beams B3, B4, and B5 are respectively produced by the laser beam sources L3, L4, and L5. The laser beams B3, B4, and B5, which have been produced by the laser beam sources L3, L4, and L5, pass through two units U2 and U3 and are thereby combined with one another.

The laser beams B3, B4, and B5, which have been produced by the laser beam sources L3, L4, and L5, are the linearly polarized laser beams. The planes of polarization of the laser beams B3, B4, and B5 are rotated respectively by halfwave plates 2C, 2D, and 2E, which are located in the optical paths of the laser beams B3, B4, and B5. The direction of the principal axis of the halfwave plate 2C coincides with the direction of polarization of the laser beam B3. The principal axis of the halfwave plate 2D is inclined by 45° with respect to the direction of polarization of the laser beam B4. Also, the principal axis of the halfwave plate 2E is inclined by 45° with respect to the direction of polarization of the laser beam B5. When the laser beams B3, B4, and B5 pass through a compensating phase difference plate H2, the phases of the laser beams B3, B4, and B5 are compensated for, and the laser beams B3, B4, and B5 are converted into the linearly polarized laser beams having a predetermined phase difference.

Thereafter, in the same manner as that explained above with reference to FIG. 3, of the laser beams B3, B4, and B5, which have passed through the compensating phase difference plate H2, the laser beams B3 and B4 which are adjacent to each other are combined with each other by a Savart plate P2. The laser beams B3 and B4, which have thus been combined with each other, impinge upon a phase difference plate S2 together with the laser beam B5. The phase difference plate S2 is constituted as a quarter-wave plate, and its principal axes coincide with the directions of polarization of the Sayart plate P2. Therefore, the laser beams B3 and B4 passing through the phase difference plate S2 are combined with each other into a linearly polarized laser beam B6 having a plane of polarization at 45° with respect to the principal axes.

Thereafter, the planes of polarization of the laser beams B6 and B5 are rotated respectively by halfwave plates 2F and 2G, which are located in the optical paths of the laser beams B6 and B5. The principal axis of the halfwave plate 2F is inclined by 45° with respect to the direction of polarization of the laser beam B6. The direction of the principal axis of the halfwave plate 2G coincides with the direction of polarization of the laser beam B5. Also, a compensating phase difference plate H3 of a unit U3 is constituted as a phase difference plate having a predetermined phase difference in accordance with an angle $\alpha 3$. Therefore, the laser beams B6 and B5, which have passed through the halfwave plates 2F and 2G and the compensating phase difference plate H3, are converted into the laser beams having the directions of polarization, which are orthogonal to each other. Also, the phases of the laser beams B6 and B5 are compensated for, and the laser beams B6 and B5 are converted into the laser beams having a predetermined phase difference.

Thereafter, in the same manner as that explained above with reference to FIG. 3, the laser beams B5 and B6, which have passed through the compensating phase difference plate H3, are combined with each other by a Savart plate P3. The combined laser beams B5 and B6 impinge upon a phase difference plate S3. The phase difference plate S3 is constituted as a phase difference plate having a predetermined phase difference in accordance with an angle $\alpha 3$. Also, the principal axes of the phase difference plate S3 are inclined by a predetermined angle $\alpha 3$. Therefore, the components of the combined laser beams B5 and B6, which have passed through the phase difference plate S3, in the directions of the principal axes of the phase difference plate S3 are imparted with a predetermined phase lag therebetween, and the laser beams B5 and B6 are thus combined and converted into linearly polarized light. The linearly polarized light, which has been radiated out of the phase difference plate S3, impinges upon the analyzer 5. The analyzer 5 is located such that it may transmit only the laser beam, which has been polarized linearly in the direction inclined by a predetermined angle corresponding to $\alpha 3$ with respect to the principal axes of the phase difference plate S3. The linearly polarized laser beams, which have passed through the phase difference plate S3 and combined with each other, thus pass through the analyzer 5 andsimpinge upon the radiating mirror 6.

The laser beams, which have passed through the analyzer 5, are reflected by the radiating mirror 6, again pass through the analyzer 5, and then impinge upon the unit U3. The laser beams, which have thus impinged upon the unit U3, are converted by the phase difference plate S3 into an elliptically polarized laser beam. The elliptically polarized laser beam is separated by the Savart plate P3 into an ordinary-ray laser beam and an extraordinary-ray laser beam. The separated laser beams pass through the compensating phase difference plate H3 and the halfwave plates 2F and 2G and then reversely impinge upon the unit U2 as the linearly polarized laser beams, which have been imparted with a predetermined phase lag and rotation of the plane of polarization.

One of the laser beams, which have impinged reversely upon the unit U2, is converted by the phase difference plate S2 into an elliptically polarized laser beam. The elliptically polarized laser beam is separated by the Sayart plate P2 into an ordinary-ray laser beam and an extraordinary-ray laser beam. The separated laser beams pass through the compensating phase difference plate H2 and the halfwave plates 2C and 2D and then reversely impinge as two linearly polarized laser beams upon the laser beam sources L3 and L4. The two linearly polarized laser beams are then reflected by the mirror surfaces M3 and M4 and again impinge upon the unit U2. The other laser beam, which has impinged reversely upon the unit U2, passes through the halfwave plate 2E, impinges upon the laser beam source L5, and is then reflected by the mirror surface M5. In the same manner as that described above, the two adjacent laser beams among the three linearly polarized laser beams, which have again impinged upon the unit U2, are combined with each other. The resulting combined laser beam and the remaining laser beam impinge upon the unit U3 and combined with each other. The resulting combined laser beam passes through the analyzer 5, is reflected by the radiating mirror 6, and is then subjected to the same processes as those described above.

In the manner described above, the laser beams B3, B4, and B5, which have been produced by the laser beam sources L3, L4, and L5, are repeatedly reflected between the mirror surfaces M3, M4, and M5 and the radiating mirror 6 and amplified by the active layers of the laser beam sources L3, L4, and L5. By the effects of the analyzer 5, the phase difference plates S2 and S3, the Savart plates P2 and P3, and the compensating phase difference plates H2 and H3, the laser beams B3, B4, and B5 having been produced by the laser beam sources L3, L4, and L5 pass through the phase difference plates S2 and S3, are combined with one another, and are reflected repeatedly with the maximum amplification factor when the laser beams have the predetermined phase difference such that the combined laser beam may become polarized linearly in the same direction as the analyzer 5. Therefore, the laser beams having been produced by the laser beam sources L3, L4, and L5 are coherently combined with one another and amplified by the optical resonator, which is constituted of the reflecting surface of the radiating mirror 6 and the mirror surfaces M3, M4, and M5 of the laser beam sources L3, L4, and L5.

When the amplification factor of the combined laser beam becomes 1 or higher, the combined laser beam passes through the radiating mirror 6 and is radiated in a single polarized state out of the polarized light coherent combining laser apparatus.

In the embodiments described above, the two laser beams having been produced by the two laser beam sources are combined with each other, or the three laser beams having been produced by the three laser beam sources are combined with one another. However, no limitation is imposed on the number of the laser beams to be combined with one another. For example, as illustrated in FIG. 11, four laser beams B6, B7, B8, and B9 having been produced by four laser beam sources L6, L7, L8, and L9 may be combined with one another by two units U4 and U5. With the polarized light coherent combining laser apparatus in accordance with the present invention, units can be located in accordance with the number of the laser beams to be combined with one another, and thus any number of the laser beams can be appropriately combined with one another.

Also, in the embodiments described above, the Savart plate is used as the polarized light separating element. However, no limitation is imposed on the type of the polarized light separating element. For example, it is possible to employ a laminated type of polarized light separating element composed of an a–Si:H/SiO$_2$ multi-layer film, which is described in, for example, "Fabrication and Evaluation of Laminated Polarization Splitters Consisting of a–Si:H/SiO$_2$ Multilayers" by Tsuchida, et al., OQE 91–143, pp 67–72.

What is claimed is:

1. A polarized light coherent combining laser apparatus, comprising:

i) a plurality of laser beam sources, located on an approximately identical plane, which radiate a plurality of parallel laser beams having predetermined planes of polarization, said laser beam sources radiating the plurality of the laser beams such that two adjacent laser beams are linearly polarized, travel in a first direction, have a predetermined intensity ratio with respect to each other, and have orthogonal directions of polarization;

ii) at least one unit including,
      a) a compensating phase difference plate, receiving two adjacent laser beams from said plurality of laser beam sources, which compensates for phases of said two adjacent laser beams,
      b) a polarized light separating element, receiving said two adjacent laser beams from said compensating phase difference plate, which combines said two adjacent laser beams with each other into a single combined laser beam and radiates out said single combined laser beam, and
      c) a phase difference plate, receiving said single combined laser beam from said polarized light separating element, said phase difference plate having a phase difference in accordance with said predetermined intensity ratio and principal axes inclined by a predetermined angle with respect to the directions of polarization of said two adjacent laser beams;

iii) a radiating reflecting mirror, receiving said single combined laser beam from said phase difference plate, which reflects said single combined laser beam in a predetermined proportion, such that some of said single combined laser beam is radiated out of the apparatus and some of said single laser beam is reflected in a second direction, opposite said first direction, back to said unit,
   wherein said polarized light separating element separates said single laser beam travelling in said second direction into two linearly polarized separated laser beams, said two linearly polarized separated laser beams being parallel to each other and having orthogonal directions of polarization, and radiates out said two linearly polarized separated laser beams in said second direction; and iv) reflecting mirrors, each of said reflecting mirrors being located in a corresponding laser beam source of said plurality of laser beam sources, each of said reflecting mirrors reflecting a corresponding one of said two linearly polarized separated laser beams travelling in said second direction back to said unit in said first direction.

2. An apparatus as defined in claim 1 wherein the laser beam sources are constituted such that two adjacent laser beam sources themselves produce the laser beams polarized linearly in two directions of polarization, which directions are orthogonal to each other, with respect to the polarized light separating element.

3. An apparatus as defined in claim 1, wherein the laser beam sources include two adjacent laser beam sources producing laser beams having arbitrary planes of polarization, and polarization plane compensating phase difference plates associated with each of said two adjacent laser beam sources, said plates compensating for the planes of polarization such that the two adjacent laser beams constitute the laser beams polarized linearly in two orthogonal directions of polarization with respect to the polarized light separating element.

4. An apparatus as defined in claim 1 wherein the polarized light separating element is a Savart plate.

5. An apparatus as defined in claim 1, further comprising a number of said units, wherein said number of said units equals a number of adjacent pairs of laser beams radiated by said plurality of laser beam sources and said units are arranged in sequential stages.

6. An apparatus as defined in claim 5, wherein said units are positioned such that a laser beam having been radiated out of each unit impinges upon the compensating phase difference plate of an adjacent unit located at a subsequent stage.

7. An apparatus as defined in claim 6, further comprising:

v) a polarization plane rotating phase difference plate, which is located between adjacent units, said polarization plane rotating phase difference plate rotating the plane of polarization of each laser beam such that adjacent laser beams, which are among the laser beams having been radiated out of each unit, constitute said two adjacent polarized laser beams.

8. An apparatus as defined in claim 7, wherein said radiating reflecting mirror is located, in said first direction, after the last one of said units.

9. An apparatus as defined in claim 5, wherein said plurality of laser beam sources is configured in a two dimensional array.

10. An apparatus as defined in claim 6, wherein said radiating reflecting mirror is located, in said first direction, after the last one of said units.

11. An apparatus as defined in claim 7, wherein the phase difference and an angle of inclination of the principal axes of said phase difference plate of each unit are set such that, in cases where $0<|\alpha_i|<\pi/2$ and $\delta \neq m_i \cdot \pi/2$, wherein $\alpha_i$ represents the angle of inclination of the principal axes of the phase difference plate of an i'th unit, where i=1 to n, where i is an integer, n is a number of stages, i=1 at the unit at the first stage among said units and i=n at the unit in the last stage, $\delta_i$ represents the phase difference of the phase difference plate of the i'th unit, and $m_i$ is an integer, the angle of inclination $\alpha_i$ of the principal axes and the phase difference satisfy the conditions $$\phi_i = \tan^{-1} \sqrt{C_i}$$

$$\cos 2\delta_i = \tan\alpha_i / \tan 2\phi_i$$

wherein $C_i$ represents the intensity ratio of the two linearly polarized laser beams impinging upon the i'th unit and $\phi$ represents a predetermined azimuthal angle.

12. An apparatus as defined in claim 11 further an analyzer located in the optical path of the laser beam, which has been radiated out of the unit at the last stage, between the n'th unit at the last stage and the radiating reflecting mirror, said analyzer transmitting a predetermined polarized light component of the laser beam.

13. An apparatus as defined in claim 1, wherein the phase difference and an angle of inclination of the principal axes of said phase difference plate of said unit is set such that, in cases where $0<|\alpha|<\pi/2$ and $\delta \neq m \cdot \pi/2$, wherein $\alpha$ represents the angle of inclination of the principal axes of the phase difference plate of said unit, $\delta$ represents the phase difference of said phase difference plate, and m is an integer, the angle of inclination $\alpha$ of the principal axes and the phase difference $\delta$ satisfy the conditions $$\phi = \tan^{-1} \sqrt{C}$$

$$\cos 2\delta = \tan\alpha / \tan 2\phi$$

wherein C represents said predetermined intensity ratio and $\phi$ represents a predetermined azimuthal angle.

14. An apparatus as defined in claim 1, further comprising an analyzer between said unit and said radiating reflecting mirror, said analyzer transmitting a predetermined polarized light component of said single combined laser beam.

15. A method of combining laser beams comprising the steps of:

generating two linearly polarized laser beams travelling in a first direction along respective paths and having a predetermined intensity ratio and orthogonal polarizations;

a first step of compensating for phases of said two linearly polarized laser beams and outputting a first pair of compensated laser beams;

combining said first pair of compensated laser beams into a single combined beam and radiating out said single combined beam;

a first step of shifting a phase difference of said single combined laser beam in accordance with said intensity ratio and outputting a first shifted single laser beam;

radiating reflecting said first shifted single laser beam such that said first shifted single laser beam travels in a second direction opposite said first direction and such that a predetermined proportion of said first shifted single laser beam is radiated out;

a second step of shifting a phase difference of a reflected single laser beam in accordance with said intensity ratio and outputting a second shifted single laser beam;

separating said second shifted single laser beam travelling in said second direction into two separated parallel, linearly, orthogonally polarized laser beams and radiating out said two separated laser beams;

a second step of compensating for phases of said two separated laser beams and outputting a second pair of compensated laser beams;

impinging each laser beam of said second pair of compensated laser beams on a corresponding laser beam source; and reflecting an impinging laser beam such that said impinging laser beam travels in said first direction.

16. The method according to claim 15, wherein a plurality of laser beams are generated, further comprising repeating said first step of compensating, said combining, said first step of shifting, said second step of shifting, said separating, and said second step of compensating in a number of stages, setting said number of stages equal to a number of adjacent pairs of laser beams, performing said radiating reflecting step after a final stage, and performing said generating, impinging and reflecting steps prior to a first stage.

17. The method according to claim 16, further comprising configuring said plurality of laser beams in a two dimensional array.

18. The method according to claim 16 comprising, between adjacent stages, rotating a plane of polarization of each laser beam such that adjacent laser beam serve as said two linearly polarized beams in said combining step.

19. The method according to claim 15, wherein said first and second steps of shifting are performed using a single compensating phase difference plate and said first and second steps of shifting further comprise setting a phase difference and an angle of inclination principal axes of said phase difference plate such that where $0<\alpha<\pi/2$ and $\delta \neq m \cdot \pi/2$, where $\alpha$ is the angle of inclination of principal axes of said phase difference plate, $\delta$ is the phase difference of the phase difference plate and m is an integer, the following conditions are satisfied $$\phi = \tan^{-1}\sqrt{C}$$

$$\cos 2\delta = \tan\alpha/\tan 2\phi$$

where C is said predetermined intensity ratio and $\phi$ represent a predetermined azimuthal angle.

* * * * *